United States Patent
Gopalakrishnan et al.

(10) Patent No.: US 10,142,520 B1
(45) Date of Patent: Nov. 27, 2018

(54) SINGLE COLOR BACKGROUND MIXED RASTER CONTENT (MRC)

(71) Applicant: XEROX CORPORATION, Norwalk, CT (US)

(72) Inventors: Sainarayanan Gopalakrishnan, Chennai (IN); Rajasekar Kanagasabai, Chennai (IN); Vignesh Doss, Palanichettipatti (IN)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/635,260

(22) Filed: Jun. 28, 2017

(51) Int. Cl.
  *H04N 1/64* (2006.01)
  *H04N 1/40* (2006.01)
  *H04N 1/50* (2006.01)

(52) U.S. Cl.
  CPC ......... *H04N 1/642* (2013.01); *H04N 1/40062* (2013.01); *H04N 1/50* (2013.01); *H04N 2201/0094* (2013.01)

(58) Field of Classification Search
  None
  See application file for complete search history.

(56) References Cited

U.S. PATENT DOCUMENTS

| | | | |
|---|---|---|---|
| 8,224,073 B2 | 7/2012 | Nuuja et al. | |
| 8,285,035 B2 | 10/2012 | Malik et al. | |
| 8,306,345 B2 | 11/2012 | Malik et al. | |
| 9,712,698 B1* | 7/2017 | Gopalakrishnan | G06F 3/1247 |
| 2014/0177954 A1* | 6/2014 | Dauw | G06K 9/00456 |
| | | | 382/164 |

FOREIGN PATENT DOCUMENTS

JP 2008288912 A * 11/2008

* cited by examiner

*Primary Examiner* — Barbara Reinier (57) ABSTRACT

The present disclosure discloses methods and systems for generating a mixed raster content (MRC) format file for single background color image document. The method includes receiving an input document at an image capturing device. The input document is segmented into an image layer and a text layer. Then it is determined whether the image layer including a single background color. Upon affirmative determination, a new text layer with a background color mask is generated. The text layer and the new text layer is compressed using a compression scheme. The compressed text layer and the new text layer are integrated to generate an image data in the MRC file format. The generated image data is stored in a memory device.

24 Claims, 10 Drawing Sheets

OUTPUT OF CONVENTIONAL APPROACH

OUTPUT OF PRESENT APPROACH

SINGLE COLOR BACKGROUND MIXED RASTER CONTENT (MRC)

TECHNICAL FIELD

The present subject matter relates generally to mixed raster content (MRC) imaging systems and more particularly to a method and a system for generating a MRC file format for single color background.

BACKGROUND

In printing technology, scanning, exporting, and storing of color images in a printing network have started to become the standard features offered by digital multifunction devices. For such standard features, file size of an image document is an important factor. The file size of the image document that needs to be exported or stored is nowadays optimized using different available compression schemes and/or file formats. One of the popular compression schemes/file formats that are currently being offered is Mixed or Multiple Raster Content (MRC) file format. The MRC file format provides a way to achieve high image quality with small file size.

The MRC file format is generated by segmenting the image document (such as image file comprising mixed content such as text and pictorial/image data) into two or more layers including, for example, image layer (background layer) and text layer (foreground layer). Segmentation of the image document into the layers tends to improve compression of the image document, and also allows different compression methods to be applied to the different layers. For example, it is generally known in the art that MRC compression scheme implements JPEG compression to the image layer and JBIG2 compression to the text layer, in order to manipulate and compress the image document.

However, it is generally known that the JPEG compression is a lossy compression for digital images, particularly for those images produced by digital devices. Therefore, such lossy compression tends to produce artifacts that are visible while regeneration of the image layer (background layer). Accordingly, there is a need for a method of and a system for generating a MRC file format having lossless compression.

SUMMARY

In one implementation, a method for generating a mixed raster content (MRC) format file for single background color image document is disclosed. The method includes receiving an input document at an image capturing device. Upon receipt of the input document, the input document is segmented into an image layer and a text layer. Then, a determination is made as to whether the image layer comprising a single background color. Upon affirmative determination, a new text layer with a background color mask is generated and compressed with (original) text layer using a compression scheme. Then, the compressed layers are integrated to generate an image data in the MRC file format. The generated image data is then stored in a memory device.

In another implementation, an image processing system implementing the subject matter includes a processor, an image capturing device, a segmentation module, and a compression module. The input device is provided to receive an input document. The received input document is then segmented by the segmentation module into an image layer and a text layer. Thereafter, the compression module determines whether the image layer comprising a single background color, and upon affirmative determination, generates a new text layer with a background color mask. Then, the new text layer is compressed along with the original text layer using a compression scheme. Then, the compressed layers are integrated to generate an image data in the MRC file format. The generated image data is then stored in a memory device.

In yet another implementation, a non-transitory computer-readable medium implementing the subject matter includes instructions executable by a processing resource. The instructions are executed to receive an input document at an image capturing device. Upon receipt of the input document, the input document is segmented into an image layer and a text layer. Then, a determination is made as to whether the image layer comprising a single background color. Upon affirmative determination, a new text layer with a background color mask is generated and compressed with (original) text layer using a compression scheme. Then, the compressed layers are integrated to generate an image data in the MRC file format. The generated image data is then stored in a memory device.

Other and further aspects and features of the present subject matter will be evident from the following detailed description of the exemplary implementations, which are intended to illustrate, not limit, the present subject matter.

BRIEF DESCRIPTION OF FIGURES

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DETAILED DESCRIPTION

A few aspects of the present subject matter are explained in detail below with reference to the various figures. Example implementations are described to illustrate the disclosed subject matter, not to limit its scope, which is defined by the claims. Those of ordinary skill in the art will recognize a number of equivalent variations of the various features provided in the description that follows.

Non-Limiting Definitions

In the disclosure herein after, one or more terms are used to describe various aspects of the present subject matter. For better understanding of the subject matter, a few definitions are provided herein for better understating of the present disclosure.

"Image data" refers to a pattern of physical light captured or generated at a user device including workstations, personal computers, personal digital assistants (PDAs), laptop computers, notebooks, smart phones, and the like. The image data may include fill objects such as characters, words, text, and other objects such as graphics, photos, etc. The image data may be included in a set of one or more input images, such as in input images of the pages of a document. The input image may be divided into segments, objects, or structures, each of which is itself an image. A segment, object, or structure of the input image may be of any size up to and including the whole input image.

"Image capturing device" may be an input device. The image capturing device may be any type of device for receiving the image data. Examples of the image capturing device may include, but not limited to, a scanning device, a facsimile device, a computing device, a storage device, and the like.

"Processor" may be a single dedicated processor, a single shared processor, or a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

"Mixed or Multiple Raster Content (MRC) file format" is a format storing compressed images into at least two components, namely text layer component and an image layer component. By storing the images into two different components, the most efficient and accurate compression algorithms can be used for each type of the components.

"Image layer" is one of the layer components stored in the MRC file format. Image layer may be used for storing continuous-tone (i.e., contone) information, such as background attributes of an image, like pictures and/or smoothly varying background colors.

"Text layer" is one of the layer components stored in the MRC file format. Text layer may hold the color information corresponding to the corresponding text and/or line art found in the text layer.

"New text layer" is a text layer generated with a background color mask. In other words, in case the image layer component is of single background color, then the image layer is converted as new text layer with background color of the image assigned as mask.

"Printer" may be defined as including, but not necessarily limited to, a peripheral that produces a representation of a document on one or both sides of media such as paper, plastic sheet, fabric, etc. A printer can be single function device or multi-function (e.g., including scanning, faxing, or other functionality) device. The multi-function device may include software, hardware, firmware, or combination thereof. Further, the printer can use any of a variety of different types of marking technologies such as laser, inkjet, dye-sublimation, off-set printing, thermal printing, impact printing, etc. As used herein, the terms "render" and "rendering" are defined as including, but not necessarily limited to, taking print data such as text, images, graphics, etc. and converting them into a ready to print (RTP) format that is compatible with a destination printer.

"Image scanner" often abbreviated to just scanner. Although the term is ambiguous out of context (barcode scanner, CAT scanner, etc.), the image scanner is a device that optically scans images, printed text, handwriting, or an object and converts it to a digital image.

"Image reader" is a computer program that can display stored graphical images. The image reader can often handle various graphics file formats. Such computer program or reader usually renders the image according to properties of the display such as color depth, display resolution, and color profile.

"Document generator" is a programming tool that generates software documentation intended for programmers (API documentation) or end users, or both, from a set of specially commented source code files, and in some cases, binary files.

"Computer-readable medium" or "storage medium" may be a physical medium that can store data. Examples of "computer-readable medium" may include magnetic medium such as diskettes, floppy disks, and tape; optical medium such as laser disks and CD-ROMs; and semiconductor medium such as semiconductor ROMs and RAMs. As used herein, "storage medium" covers one or more distinct units of a medium that together store a body of data. For example, a set of floppy disks storing a single body of data may together be storage medium.

Overview

Various exemplary implementations of a method and a system according to this disclosure process an image data of a document to produce highly-compressed image data files that accurately capture the original document content and provide optimal file size and image quality balance for processing and output of the image data. File size and quality are some factors that users face when compressing and exporting color images using digital multifunction devices and printers. Apart from offering different resolutions, different compression schemes are being offered in these devices as well.

Various method(s) and system(s) of the present subject matter described herein allow generation of a Mixed or Multiple Raster Content (MRC) file format. The method begins with receipt of an input document having image data including a plurality of pixels. The image data may be received as the input document by, for example, an image capturing device, or retrieved from storage or memory. In an example, the image capturing device may be an input device. The image capturing device may be any type of device for receiving input image data. Example, of the image capturing device may include, but not limited to, a scanning device, a facsimile device, a computing device, a storage device, and the like.

Once the input document is received, the input document is processed to determine the different types of data represented by the plurality of pixels of the image data using existing segmentation techniques. For example, the image data may include pixels representing, but not limited to, text, edge, background, and pictorial (non-text area) information. As per the present subject matter, any number of segmentation methods or techniques may be used for the determination of the types of data represented by the plurality of the pixels of the image data. Then, based on the determined types of data represented by the plurality of pixels, the segmentation methods or techniques segment the input document into an image layer and a text layer. The image layer includes the background and non-textual information, while the text layer includes the textual information.

The application of segmentation methods or techniques is followed by a processing step of determining whether the image layer comprising a single background color. In case the image layer comprises more than one background color, the conventional compression scheme is applied. As per the conventional compression scheme, the image layer or background layer is compressed using standard contone compression schemes such as JPEG, while the text layer is compressed using any of the binary compression schemes such as JBIG2.

As per an implementation of the present subject matter, in case the image layer includes a single background color, a new text layer with a background color mask is generated. Then, both the (original) text layer and the new text layer are separately compressed using any of the binary compression schemes, such as JBIG2. With the addition of the new text layer to the original text layer and compressing the both layer with binary compression scheme, not only improves text quality, but may also provide opportunities for file size reduction (i.e., efficient data compression).

After completion of the compression, the (original) text layer and the new text layer are integrated to generate to produce the image data in the MRC file format. The image data in the MRC file format is then stored into a memory device.

The present subject matter may further optionally include additional steps, which are not meant to be limiting. For example, after the compression and storage, the image data may be optionally decompressed and output by an output device. The output device may be any type of device that is designed to output the image data. Examples of the output device may include, but not limited to, display, copy, print, or send the image data. Such output devices may further include a multifunctional device (MFD) or a printer.

Exemplary Implementations

The following disclosure explains a mechanism where a printing system, with some hardware and software enhancements, is enabled to facilitate a user of a user device (or client device) to fabricate a new rasterized buffer of modified background form in order to support some sophisticated applications associated with personal, business, or administrative implementations. Such printing system is further described with reference to FIGS. 1-9.

It should be noted that the description and the figures merely illustrate the principles of the present subject matter along with examples described herein, and should not be construed as a limitation to the present subject matter. It is, thus, understood that various arrangements may be devised that, although not explicitly described or shown herein, embody the principles of the present subject matter. Moreover, all the statements herein reciting principles, aspects, and implementations of the present subject matter, as well as specific examples thereof, are intended to encompass equivalents thereof.

Figure 1:
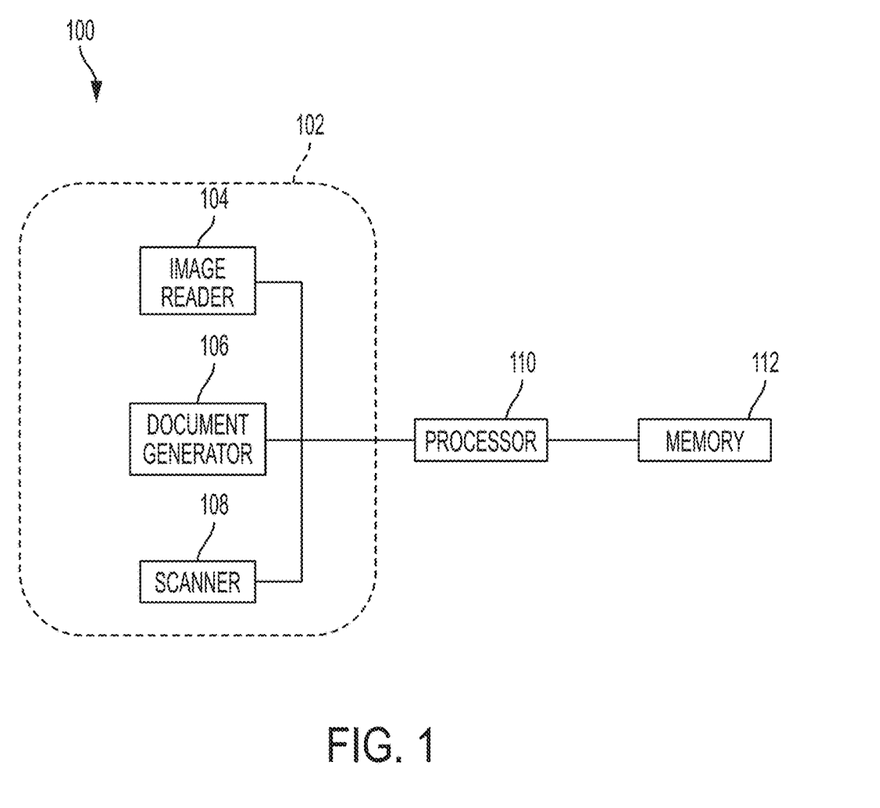
FIG. 1 illustrates an image processing system as per an implementation of the present subject matter.

FIG. 1 illustrates an image processing system 100 as per an implementation of the present subject matter. The image processing system 100 employs an image capturing device 102 to read or otherwise receive an input document or image, optionally, a full color document or image. The image capturing device 102 may include one or more suitable input devices such as an electronically or otherwise stored image reader 104 which reads in the input document or image as pixels or digital image data, a computer image or document generator 106 which generates the input document or image as pixels or digital image data, a scanner 108 which optically scans images, printed text, handwriting or an object and converts it to a digital image data, or the like. Such digitized image data exists as a file on a computer network or a document management/processing network.

The image data of the input document is then processed by a processor 110 coupled to the image capturing device 102. The processor 110, amongst other capabilities, may be configured to fetch and execute computer-readable instructions stored in a memory 112. The processor 110 may be implemented as one or more microprocessors, microcomputers, microcontrollers, digital signal processors, central processing units, state machines, logic circuitries, and/or any devices that manipulate signals based on operational instructions. The functions of the various elements shown in the figure, including any functional blocks labeled as processor (s), may be provided through the use of dedicated hardware as well as hardware capable of executing software in association with appropriate software.

When provided by the processor 110, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

Returning to the present subject matter, the processor 110 carries out segmentation followed by an MRC compression on the image data. Once the segmentation and compression of the received image data is completed, the compressed image data is output by the processor 110. The image data is then electronically stored in the memory 112 or an otherwise appropriated storage device. Alternately, the image data is stored optically or magnetically on a disk or tape. In any event, the compressed document or image is readily accessed and/or transported over the network in the usual manner. Further, as mentioned above in the present disclosure, prior to rendering by an appropriate rendering engine or device, such as a printer, display monitor, digital copier, fax machine, and the like, the compressed image data is first decompressed or otherwise reconstructed in the usual manner.

Figure 2:
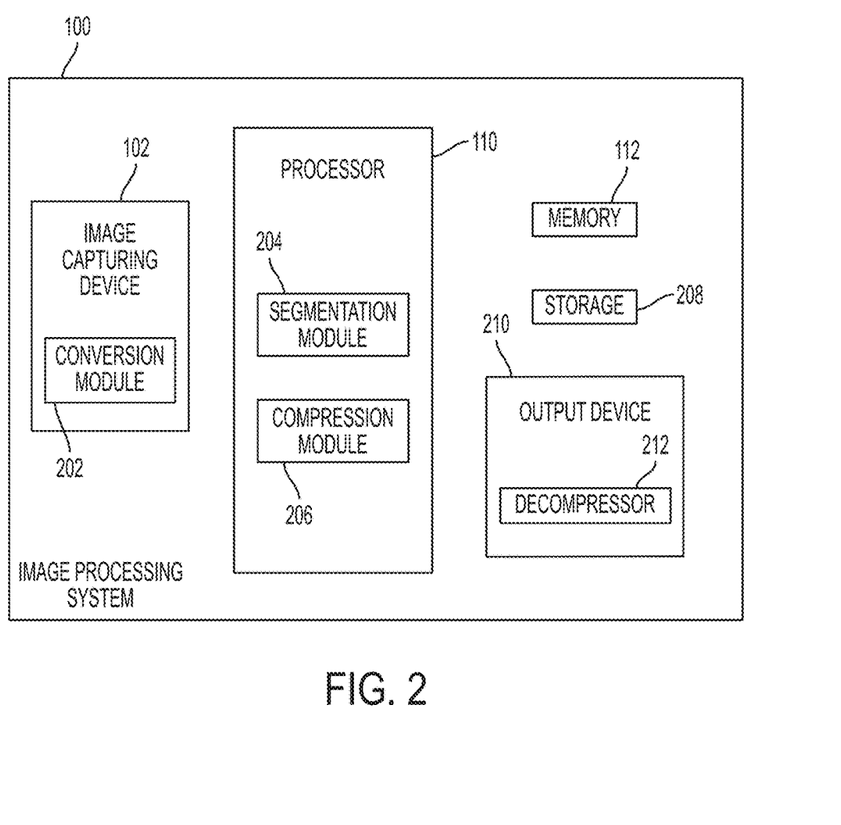
FIG. 2 illustrates the image processing system in detail as per an implementation of the present subject matter.

The image processing system 100 and the processes associated with the image processing system 100 are shown and described with reference to FIG. 2, in accordance with an implementation of the present disclosure. In FIG. 2, the image processing system 100 includes a number of devices for processing of image data. In an exemplary implementation, each of the devices shown in the image processing system 100 may also be considered as modules, and, therefore, the terms "device" and "module" are used interchangeably hereinafter. Further, the "devices" or "modules" illustrated in FIG. 2 are not meant to be limiting.

As per the implementation shown in FIG. 2, the capturing device 102 of the image processing system 100 is configured to receive image data as an input document. In an example, the image capturing device 102 may be an input device. The image capturing device 102 may be any type of device for receiving the image data. Examples of the image capturing device 102 may include, but not limited to, a scanning device, a facsimile device, a computing device, a storage device, and the like.

In an implementation, the image capturing device 102 may include a conversion module 202 for converting the received image data, such as converting gray scale image data from an input device color space, such as RGB (red, green, blue), to a device independent processing color space, such as YCC/YCBCR (where Y' is the luma component and CB and CR are the blue-difference and red-difference chroma components) or LAB (where L for lightness and a and b for the color opponents green-red and blue-yellow) color space, where intensity and color information (i.e., luminance and chrominance) are separated. Generally, the types of color spaces for image data and the conversion of such color spaces are known in the art. The conversion module 202 may be a part of the image capturing device 102 or a separate device or module, without deviating from the scope of the present subject matter.

As discussed above in the present disclosure, the received image data comprises a plurality of pixels. The plurality of pixels of the image data is processed by a segmentation module 204 of the processor 110 in order to separate or segment the image data signal (or input data) into different layers. The segmentation module 204 segments the image data for compression. In an implementation, the segmentation module 204 may be configured to segment and optionally tag the image data (e.g., each of its pixels) to identify the types of data represented before a compression scheme is determined and/or selected. For example, based on the tag information associated with the image data, the segmentation module 204 generally segments the image data into an image layer and a text layer. The image layer includes the background and non-textual information, while the text layer includes the textual information. The image layer and the text layer are then compressed using standard compression schemes and are integrated in accordance with MRC compression scheme using a compression module 206 of the processor 110.

After completion of the compression by the compression module 206, the image layer and the text layer are integrated and processed by the processor 110. The processor 110 may be coupled to a combination of image processing elements or modules (not shown in figures) which comprise software and hardware elements that may perform a number of operations on the image data received from the image capturing device 102 using a set of parameters. The set of parameters may be used to convert the integrated layers to a format desired as output (e.g., high quality) along an image path. In an example, the integrated layers are converted to MRC file format. The elements may be a part of a computer system, device, or apparatus such as a photocopier, a printing device, or a multi-function device (MFD).

The MRC file format data is then provided by or stored by the processor 110 in the memory 112 or the storage 208. From the memory 112 or the storage 208, an output device 210 may be provided to output the image data. The output device 210 may be any type of device that is designed to output the image data. For example, the output device 210 may display, copy, print, or send the image data. Examples of the output device 210 may include, but not limited to, an MFD, printer, copier, scanner, facsimile device, display, a terminal, an image storage system, and CPU.

In an implementation, the output device 210 may decompress the image data and its information before output. For decompression, the image processing system 100 or the output device 210 may include a decompressor 212 to decompress the image data before sending the image data to a rendering engine of the output device 210. The decompressor 212 and the output device 210 may be the same module, or separate modules, without deviating from the scope of the present subject matter.

Furthermore, the image processing system 100 described with reference to FIG. 2 may implement a conventional compression scheme as well as a new compression scheme in accordance with the present subject matter disclosed herein, to improve the text representation quality of output of the image processing system 100.

Figure 3:
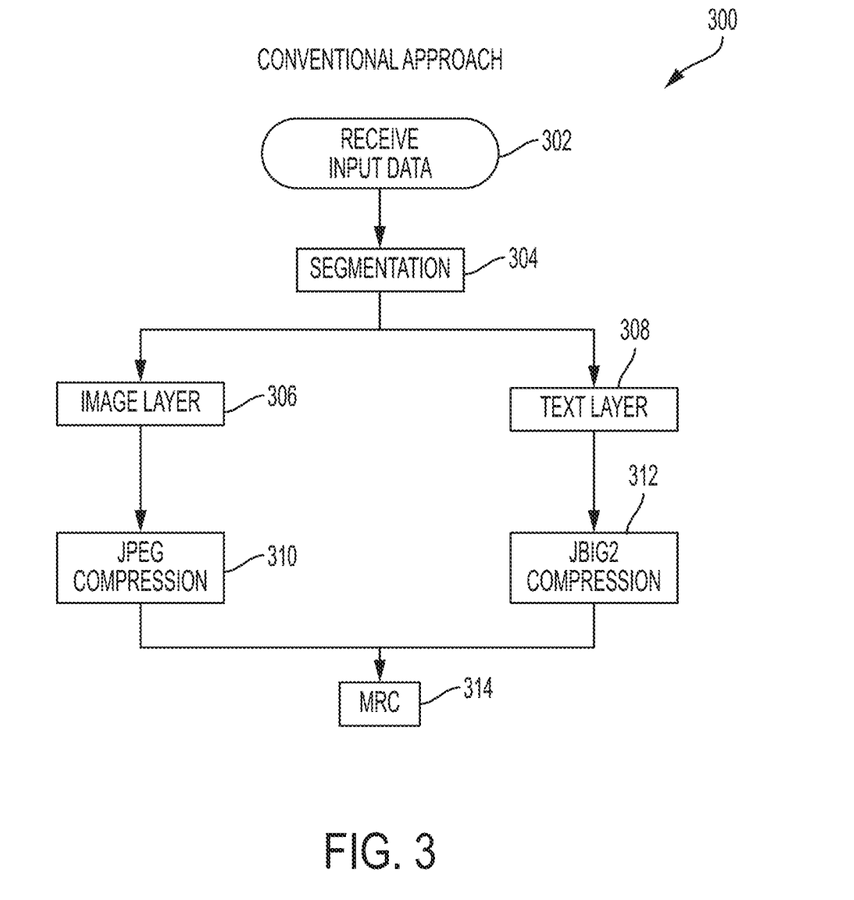
FIG. 3 illustrates a conventional MRC compression scheme.

FIG. 3 illustrates a conventional compression scheme 300. As per the conventional compression scheme, the image capturing device 102 of the image processing system 100 is configured to receive image data as an input document (Step 302). Thereafter, the plurality of pixels of the image data is processed by the segmentation module 204 of the processor 110 in order to separate or segment the image data signal (or input data) into different layers. The segmentation module 204 segments the image data for compression (Step 304). The segmentation module 204 generally segments the image data into the image layer (Step 306) and the text layer (Step 308). The image layer includes the background and non-textual information, while the text layer includes the textual information. Thereafter, as per the conventional compression scheme 300 shown in FIG. 3, the image layer is compressed using standard contone compression schemes such as JPEG (Step 310), while the text layer is compressed using any of the binary compression schemes such as JBIG2 (Step 312). Thereafter, the compressed text and image layers are integrated in accordance with MRC compression scheme to generate MRC file format (Step 314). However, with the implementation of the conventional compression scheme, compression artifacts are visible in the background of the output image.

Figure 4:
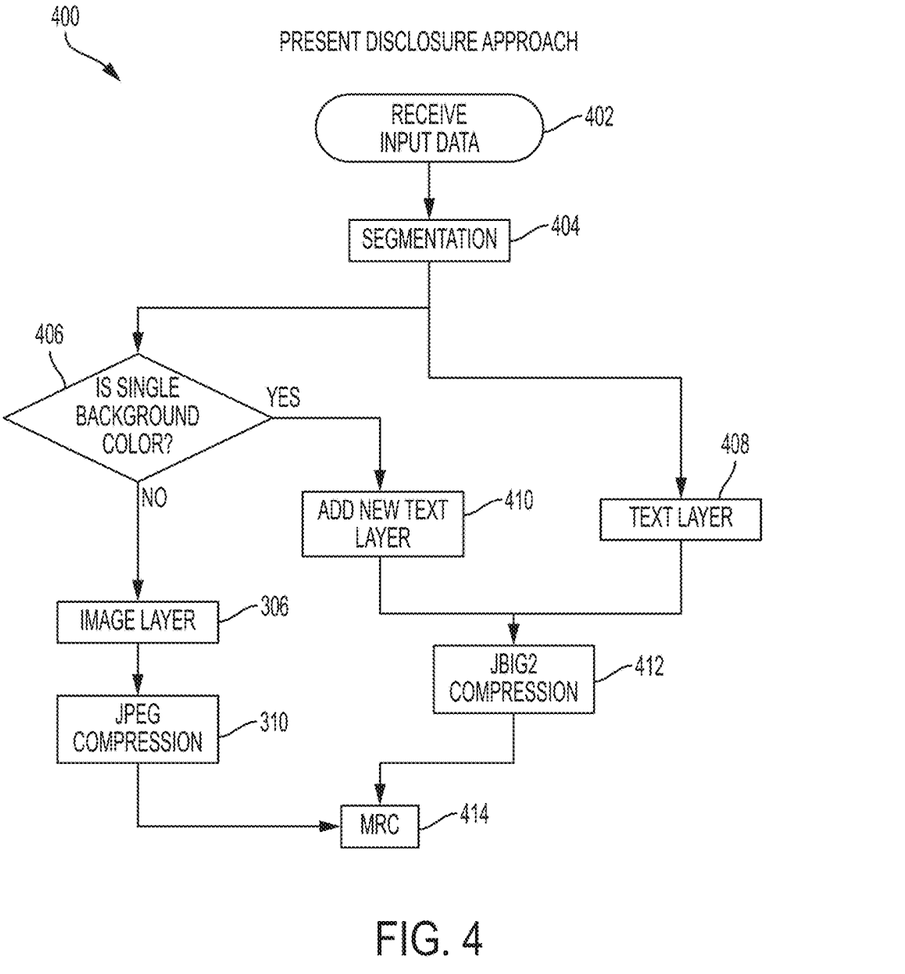
FIG. 4 illustrates an MRC compression scheme according to an implementation of the present subject matter.

In order to remove the visibility of such compression artifacts in the background of the output image, a new compression scheme 400 shown in FIG. 4 is implemented in the image processing unit 100 in accordance with the present subject matter disclosed herein. As per the new compression scheme, the image capturing device 102 of the image processing system 100 receives the image data as an input document (Step 402). Thereafter, the plurality of pixels of the image data is processed by the segmentation module 204 of the processor 110 in order to separate or segment the image data (Step 404). In an implementation, the segmentation module 204 may be configured to segment and optionally tag the image data (e.g., each of its pixels) to identify the types of data represented before a compression scheme is determined and/or selected. For example, based on the tag information associated with the image data, the segmentation module 204 generally segments the image data into an image layer (Step 406) and the text layer (Step 408). The image layer includes the background and non-textual information, while the text layer includes the textual information.

However, as per the implementation of the present subject matter, prior to generation of the image layer, the segmentation module 204 in association with the processor 110 determines whether the image layer comprising a single background color or not (Step 406).

In case the image layer comprises more than one background color, the conventional compression scheme is applied by the compression module 206 of the processor 110. As per the conventional compression scheme, the image layer is compressed using standard contone compression schemes such as JPEG (310), while the text layer is compressed using any of the binary compression schemes such as JBIG2 (312). Thereafter, compressed image layers are integrated in accordance with MRC compression scheme to generate MRC file format.

However, in case the image layer includes a single background color, the compression module 206 generates a new text layer with a background color mask (Step 410), in place of the image layer. Then, both the (original) text layer (generated in Step 408) and the new text layer (generated in Step 410) are compressed using any of the binary compression schemes such as JBIG2 (Step 412). Thereafter, compressed text layers are integrated in accordance with MRC compression (414) scheme to generate MRC file format.

Figure 5:
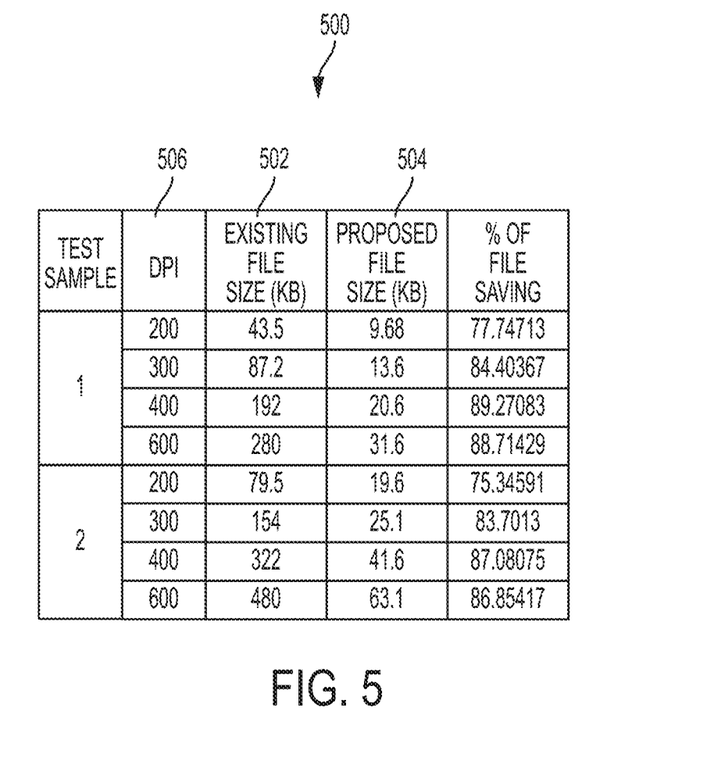
FIG. 5 illustrates a table representing the file size comparison between the conventional and proposed MRC compression scheme.

Such addition of the new text layer to the original text layer not only improves text quality, but may also provide opportunities for file size reduction (i.e., efficient data compression), as can be seen from comparison table chart shown in FIG. 5.

FIG. 5 shows a comparison table chart 500 showing the comparison between the file size output (Existing File Size 502) of the conventional compression scheme 300 and file size output (Proposed File Size 504) of the present/new compression scheme 400 of the present disclosure. The comparison between the file size output of the conventional compression scheme 300 and the present/new compression scheme 400 clearly show that under various output resolutions (dot per inch (DPI) 506, the file size output of the present/new compression scheme 400 is smaller than file size output of the conventional compression scheme 300.

Thus, with the implementation of the present subject matter, the image data is output using the various approaches and implementations of the present subject matter with reduced or no compression artifacts, as can be seen from the comparison of output 600 (refer to FIGS. 6A, 6B, 6C) generated by conventional compression scheme 300 discussed above in FIG. 3, with output 700 (refer to FIGS. 7A, 7B, and 7C) of the proposed compression scheme 400 of the present disclosure discussed above in FIG. 4.

Figure 6A:
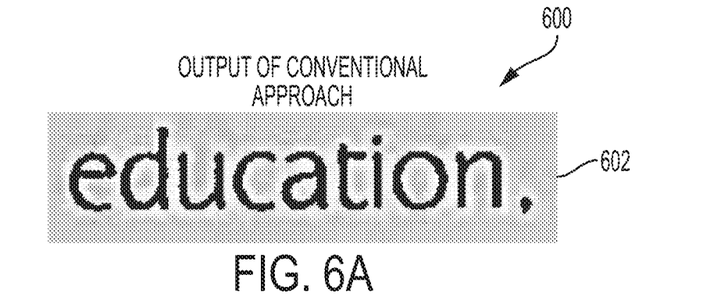
FIGS. 6A-6C and 7A-7C illustrate various exemplary implementations of the present subject matter.

For example, in an output image 602 shown in FIG. 6A, the text "education" have artifacts on the single background color with the implementation of the conventional compression scheme 300. However, on the other hand, in an output image 702 shown in FIG. 7A, the text "education" have no artifacts on the single background color with the implementation of the present/new compression scheme 400. This improves the clarity and quality of the output image 702.

Figure 6B:
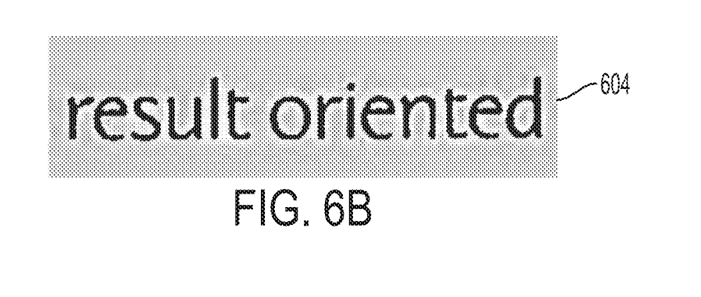
Figure 6C:
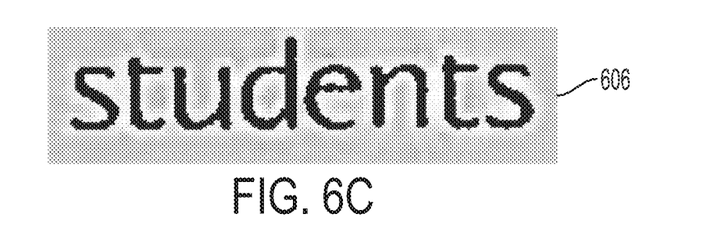
Figure 7A:
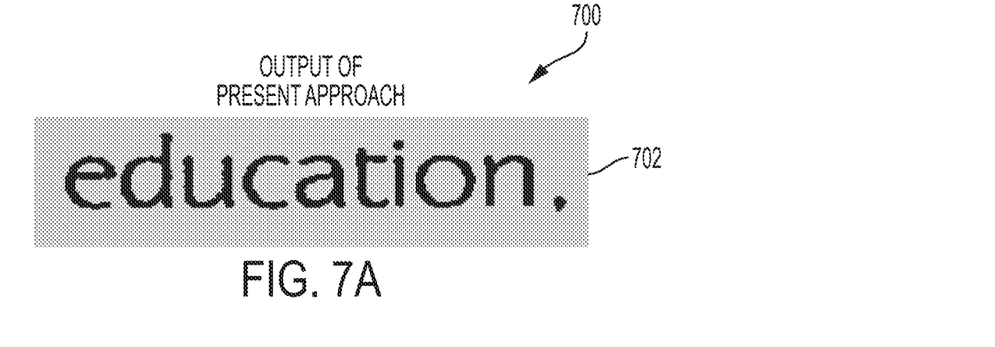
Figure 7B:
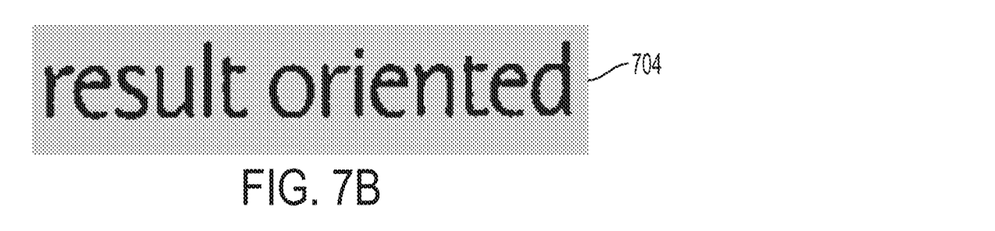
Figure 7C:
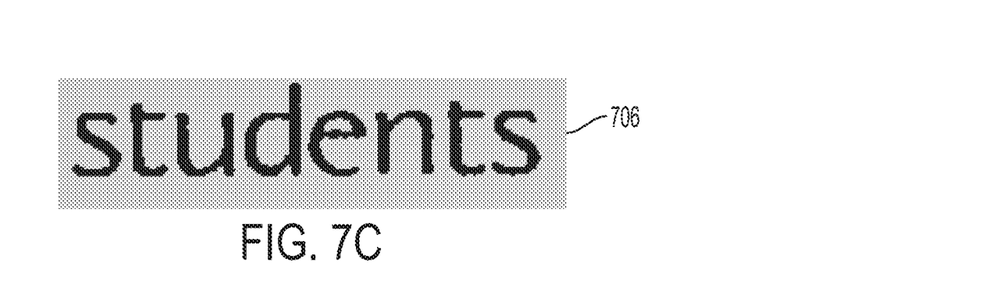

Similar to the comparison of the implementation of the conventional compression scheme 300 and the present/new compression scheme 400 for the text "education," FIGS. 6B and 7B show comparison for the text "result oriented" with reference numerals 604 and 704, and FIGS. 6C and 7C show comparison for the text "students" with reference numerals 606 and 706, where output images 704, and 706 of the present disclosure provide clarity and quality of the output image.

Figure 8:
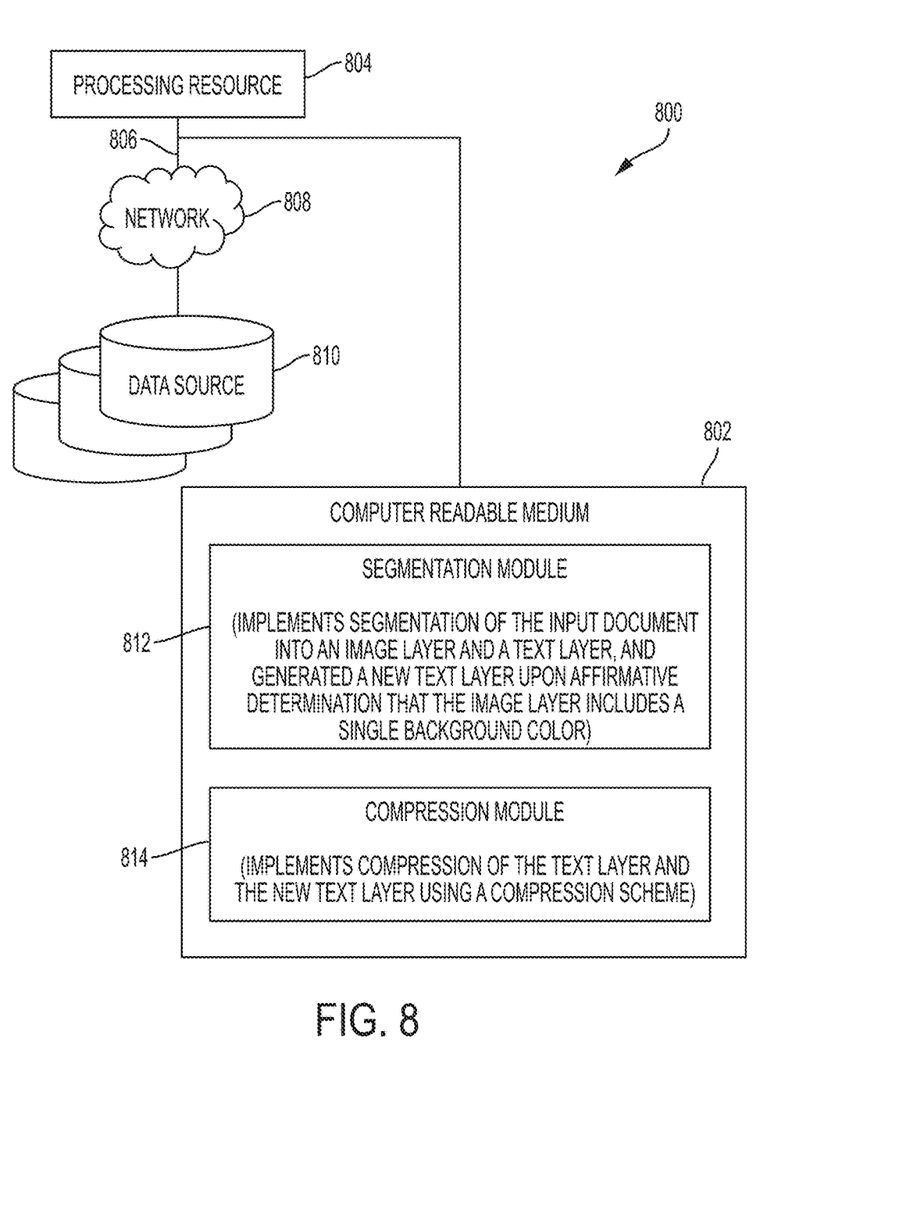
FIG. 8 illustrates a networking environment for the image processing system in accordance with present subject matter.

FIG. 8 illustrates an example network environment 800 using a non-transitory computer readable medium 802 for performing operation of the image processing system 100, according to an implementation of the present subject matter. The network environment 800 may be a public networking environment or a private networking environment. In one example, the network environment 800 includes a processing resource 804 communicatively coupled to the non-transitory computer readable medium 802 through a communication link 806.

For example, the processing resource 804 can be a processor, such as control device of the image processing system 100. The non-transitory computer readable medium 802 can be, for example, an internal memory device or an external memory device. In one example, the communication link 806 may be a direct communication link, such as one formed through a memory read/write interface. In another example, the communication link 806 may be an indirect communication link, such as one formed through a network interface. In such a case, the processing resource 804 can access the non-transitory computer readable medium 802 through a network 808. The network 808 may be a single network or a combination of multiple networks and may use a variety of communication protocols.

The processing resource 804 and the non-transitory computer readable medium 802 may also be communicatively coupled to data sources 810 over the network 808. The data sources 810 can include, for example, databases and computing devices. The data sources 810 may be used by the database administrators and other users to communicate with the processing resource 804.

In one example, the non-transitory computer readable medium 802 can include a set of computer readable instructions, such as a segmentation module 812 and a compression module 814. The set of computer readable instructions, referred to as instructions hereinafter, can be accessed by the processing resource 804 through the communication link 806 and subsequently executed to perform acts for network service insertion. In other words, during operation, the processing resource 804 can execute the segmentation module 812 and the compression module 814.

On execution by the processing resource 804, the segmentation module 812 can receive an image data comprising a plurality of pixels. The plurality of pixels of the image data is processed by the segmentation module 812 in order to separate or segment the image data signal (or image data) into different layers. In an implementation, the segmentation module 812 may be configured to segment and optionally tag the image data (e.g., each of its pixels) to identify the types of data represented before a compression scheme is determined and/or selected. For example, based on the tag information associated with the image data, the segmentation module 812 generally segments the image data into an image layer and a text layer. The image layer includes the background and non-textual information, while the text layer includes the textual information.

Further, as per the implementation of the present subject matter, prior to generation of the different image and text layers, the segmentation module 812 in association with the processing resource 804 determines whether the image layer comprises a single background in color or not.

In case the image layer comprises more than one background color, the conventional compression scheme is applied by the compression module 814. As per the conventional compression scheme shown in FIG. 3, the image layer is compressed using standard contone compression schemes such as JPEG, while the text layer is compressed using any of the binary compression schemes such as JBIG2. Thereafter, compressed image layers are integrated in accordance with MRC compression scheme to generate MRC file format.

One the other hand, in case the image layer includes a single background color, the compression module 814 generates a new text layer with a background color mask, in place of the image layer. Then, both the (original) text layer and the new text layer are compressed using any of the binary compression schemes such as JBIG2. Such addition of the new text layer to the original text layer not only improves text quality, but may also provide opportunities for file size reduction (i.e., efficient data compression).

After completion of the compression, the (original) text layer and the new text layer are integrated to generate to produce the image data in the MRC file format. The image data in the MRC file format is then stored into a memory device.

Figure 9A:
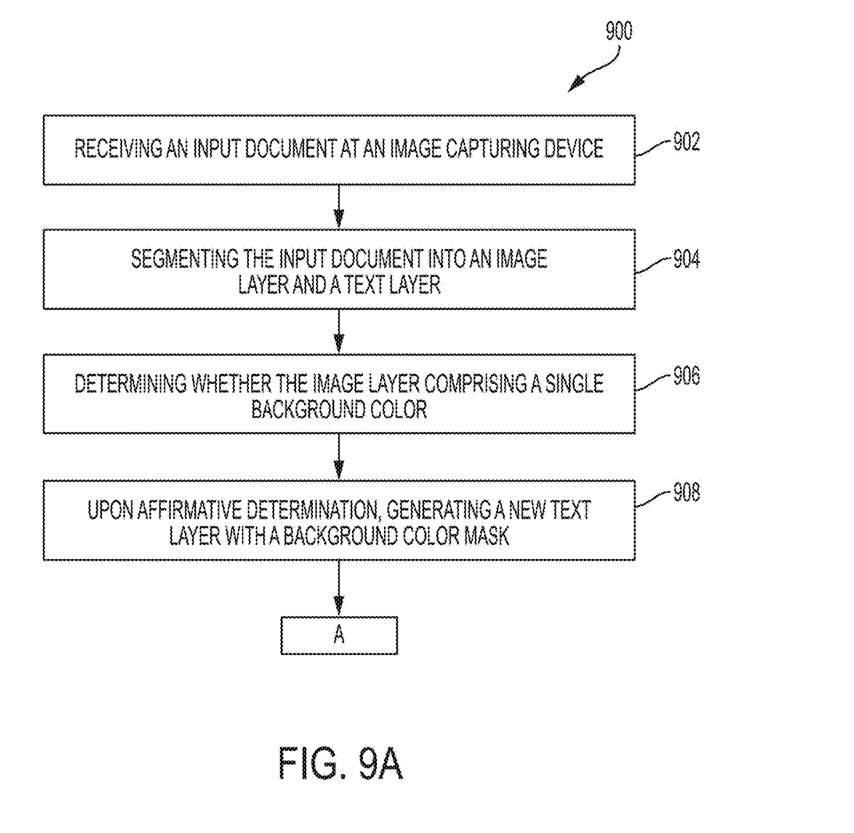
FIGS. 9A-9B illustrate a method of implementing the various processes of the image processing system.
Figure 9B:
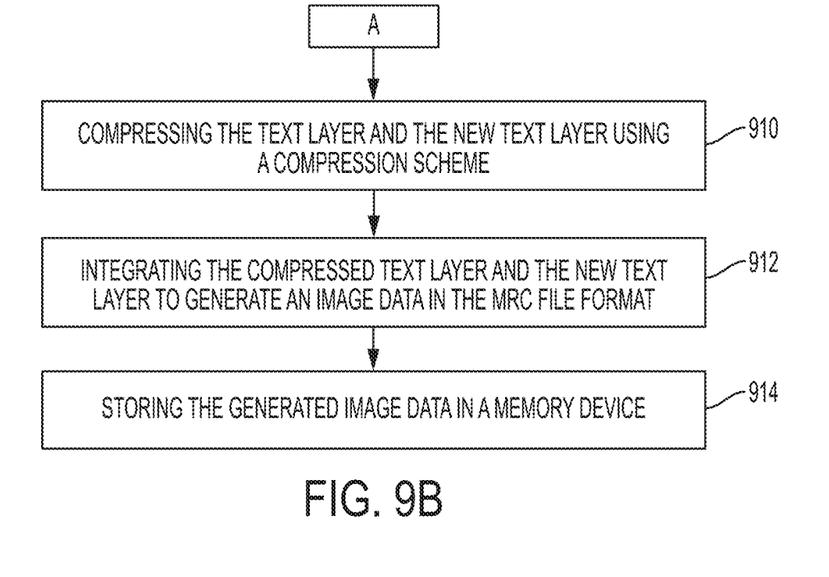

Method 900 is described in FIGS. 9A and 9B for operating the image processing system 100, according to an implementation of the present subject matter. The order in which the method 900 is described is not intended to be construed as a limitation, and any number of the described method blocks can be combined in any appropriate order to carry out the method 900 or an alternative method. Additionally, individual blocks may be deleted from the method 900 without departing from the scope of the subject matter described herein.

The method 900 can be performed by programmed computing devices, for example, based on instructions retrieved from the non-transitory computer readable medium or non-transitory computer readable media. The computer readable media can include machine-executable or computer-executable instructions to perform all or portions of the described method. The computer readable media may be, for example, digital memories, magnetic storage media, such as a magnetic disks and magnetic tapes, hard drives, or optically readable data storage media.

Referring to FIGS. 9A and 9B, the method 900 may be performed by a processing device, such as the processor 110 of the image processing system 110.

At block 902, the image processing system 100 receives an input document having image data comprising a plurality of pixels. The image data may be received as the input document by, for example, the image capturing device 102, or retrieved from the storage 208 or the memory 112. In an example, the image capturing device 102 may be an input device. The image capturing device may be any type of device for receiving input image data. Example, of the image capturing device may include, but not limited to, a scanning device, a facsimile device, a computing device, a storage device, and the like.

At block 904, once the input document is received, the input document is processed to determine the different types of data represented by the plurality of pixels of the image data using existing segmentation techniques. For example, the image data may include pixels representing, but not limited to, text, edge, background, and pictorial (non-text area) information. As per the present subject matter, any number of segmentation methods may be implemented to segment the input data having the image data into an image layer and a text layer.

At block 906, the application of segmentation methods or techniques is followed by a processing step of determining whether the image layer comprising a single background color.

At block 908, in case the image layer includes a single background color, a new text layer with a background color mask is generated.

At block 910, both the (original) text layer and the new text layer are compressed using any of the binary compression schemes, such as JBIG2. With the addition of the new text layer to the original text layer and compressing the both layer with binary compression scheme, not only improves text quality, but may also provide opportunities for file size reduction (i.e., efficient data compression).

At block 912, after completion of the compression schemes, the (original) text layer and the new text layer are integrated and processed by the processor 110. The processor 110 may be coupled to a combination of image processing elements or modules (not shown in figures) which comprise software and hardware elements that may perform a number of operations on the image data received from the image capturing device 102 using a set of parameters. The set of parameters may be used to convert the integrated layers to a format desired as output (e.g., high quality) along an image path. In an example, the integrated layers are converted to MRC file format.

At block 914, the MRC file format data is provided by or stored by the processor 110 in the memory 112 or the storage 208. From the memory 112 or the storage 208, an output device 210 may be provided to output the image data. The output device 210 may be any type of device that is designed to output the image data. For example, the output device 210 may display, copy, print, or send the image data. Examples of the output device 210 may include, but not limited to, an MFD, a printer, a copier, a scanner, a facsimile device, display, a terminal, an image storage system, and a CPU.

Further, the present subject matter is disclosed herein with reference to a image processing architecture; however, the subject matter is equally applicable to printing systems implemented in multi-functional devices, such as printers, copiers, and the like, which are in direct communication with the user devices.

The methods and systems of the present disclosure reduce file size and further improve image quality by removing compression artifacts, when documents with color backgrounds are scanned.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the disclosure, numerous references may be made regarding servers, services, schemes, engines, modules, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing," or "determining," or "presenting," or "segmenting," or "generating," "compressing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Further, the terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for generating a mixed raster content (MRC) format file for single background color image document, comprising:
    receiving an input document at an image capturing device;
    segmenting the input document into an image layer and a text layer;
    determining whether the image layer comprising a single background color;
    upon affirmative determination, generating a new text layer with a background color mask, wherein the image layer is converted into the new text layer;
    compressing the text layer and the new text layer using a compression scheme;
    integrating the compressed the text layer and the new text layer to generate an image data in the MRC file format; and
    storing the generated image data in a memory device.

2. The method as claimed in claim 1, wherein the compression scheme is JBIG2 compression.

3. The method as claimed in claim 1, wherein upon determining that the image layer has more than one background color, the method comprising:
    compressing the text layer using a first compression scheme;
    compressing the image layer using a second compression scheme;
    integrating the compressed the text layer and the image layer into the MRC file format for storage in the memory device.

4. The method as claimed in claim 3, wherein the first compression scheme is a standard contone compression scheme.

5. The method as claimed in claim 3, wherein the standard contone compression scheme comprises JPEG compression.

6. The method as claimed in claim 3, wherein the second compression scheme is a binary compression scheme.

7. The method as claimed in claim 6, wherein the binary compression scheme is JBIG2 compression.

8. The method as claimed in claim 1, further comprising:
    extracting the MRC file format from the memory device to retrieve the compressed text layer and the compressed image layer;
    decompressing the MRC file format; and
    transmitting the decompressed MRC file format to an output device.

9. An image processing system for generating a mixed raster content (MRC) format file for single background color image document, the image processing system comprising:
    an input device for receiving an input document;
    a processor, coupled to the input device;
    a segmentation module, coupled to the processor, to segment the input document into an image layer and a text layer; and
    a compression module, coupled to the processor, to:
        determine whether the image layer comprising a single background color;
        upon affirmative determination, generate a new text layer with a background color mask, wherein the image layer is converted into the new text layer;
        compress the text layer and the new text layer using a compression scheme;
        integrate the compressed the text layer and the new text layer to generate an image data in the MRC file format; and
        store the generated image data in a memory device.

10. The image processing system as claimed in claim 9, wherein the compression scheme is JBIG2 compression.

11. The image processing system as claimed in claim 9, wherein upon determining that the image layer has more than one background color, the compression module is to:
    compress the text layer using a first compression scheme;
    compress the image layer using a second compression scheme;
    integrate the compressed the text layer and the image layer to generate an image data in the MRC file format; and
    store the generated image data in the memory device.

12. The image processing system as claimed in claim 11, wherein the first compression scheme is a standard contone compression scheme.

13. The image processing system as claimed in claim 12, wherein the standard contone compression scheme comprises JPEG compression.

14. The image processing system as claimed in claim 11, wherein the second compression scheme is a binary compression scheme.

15. The image processing system as claimed in claim 14, wherein the binary compression scheme is JBIG2 compression.

16. The image processing system as claimed in claim 9, wherein the process is to:

extract the image data in the MRC file format from the memory device to retrieve the compressed text layer and the compressed image layer;

decompressing the image data present in the MRC file format; and transmitting the decompressed the image data present in the MRC file format to an output device.

17. A non-transitory computer-readable medium comprising instructions executable by a processing resource to:

receive an input document;

segment the input document into an image layer and a text layer;

determine whether the image layer comprising a single background color;

upon affirmative determination, generate a new text layer with a background color mask, wherein the image layer is converted into the new text layer;

compress the text layer and the new text layer using a compression scheme;

integrate the compressed the text layer and the new text layer to generate an image data in the MRC file format; and store the generated image data in a memory device.

18. The non-transitory computer-readable medium of claim 17, wherein the compression scheme is JBIG2 compression.

19. The non-transitory computer-readable medium of claim 17 comprising instructions executable by the processing resource to:

compress the text layer using a first compression scheme;

compress the image layer using a second compression scheme;

integrate the compressed the text layer and the image layer to generate an image data in the MRC file format; and store the generated image data in the memory device.

20. The non-transitory computer-readable medium of claim 19, wherein the first compression scheme is a standard contone compression scheme.

21. The non-transitory computer-readable medium of claim 20, wherein the standard contone compression scheme comprises JPEG compression.

22. The non-transitory computer-readable medium of claim 19, wherein the second compression scheme is a binary compression scheme.

23. The non-transitory computer-readable medium of claim 22, wherein the binary compression scheme is JBIG2 compression.

24. The non-transitory computer-readable medium of claim 17, comprising instructions executable by the processing resource to:

extract the image data in the MRC file format from the memory device to retrieve the compressed text layer and the compressed image layer;

decompressing the image data present in the MRC file format; and transmitting the decompressed the image data present in the MRC file format to an output device.

* * * * *